(12) United States Patent  
Livnat (10) Patent No.: US 8,301,502 B2  
(45) Date of Patent: Oct. 30, 2012

(54) METHODS AND SYSTEMS FOR ACCOUNT MANAGEMENT OF GROUP ACCOUNTS

(76) Inventor: Noam Livnat, Mountain View, CA (US)

( * ) Notice: Subject to any disclaimer, the term of this patent is extended or adjusted under 35 U.S.C. 154(b) by 295 days.

(21) Appl. No.: 12/633,590

(22) Filed: Dec. 8, 2009

(65) Prior Publication Data

US 2010/0153224 A1 Jun. 17, 2010

Related U.S. Application Data

(60) Provisional application No. 61/138,489, filed on Dec. 17, 2008.

(51) Int. Cl.
*G06G 1/12* (2006.01)
*G07F 19/00* (2006.01)
*G07B 17/00* (2006.01)
*G06Q 40/00* (2006.01)

(52) U.S. Cl. .............................. 705/21; 705/30; 705/35

(58) Field of Classification Search ........................ None
See application file for complete search history.

(56) References Cited

U.S. PATENT DOCUMENTS

| 7,103,784 | B1 | 9/2006 | Brown et al. |
| 7,117,172 | B1 * | 10/2006 | Black ............................ 705/35 |
| 2003/0236728 | A1 * | 12/2003 | Sunderji et al. ................. 705/35 |
| 2008/0014904 | A1 | 1/2008 | Crimi et al. |

* cited by examiner

*Primary Examiner* — Paul Danneman
(74) *Attorney, Agent, or Firm* — Invent Capture, LLC; Samuel S. Cho (57) ABSTRACT

Account management methods and systems are presented for managing and administering group accounts. A group may establish a financial group account using a novel group account management system in accordance with an embodiment of the invention. The novel group account management system can provide financial transaction-related controls, privileges, tracking, and/or reporting for one or more users, members, and/or sub-group within the group account. A concept of user-specific, member-specific, and/or sub-group-specific privileges is integrated into the novel group account management system to assign a particular user, member, and/or sub-group to an account management level within the group account. Furthermore, a novel concept of user-managed group account-related rules is also integrated into the novel group account management system to empower, restrict, and/or control certain transaction-related actions for at least some users, members, and/or sub-groups.

20 Claims, 6 Drawing Sheets

Table 410

Table 420

Figure 4

| Privilege Level | Accept Members | Invite Members | Edit Rules | Edit Privileges |
|---|---|---|---|---|
| 1 | Yes | Yes | Yes | Yes |
| 2 | No | Yes | Yes | Yes |
| 3 | No | No | Yes | Yes |
| 4 | No | No | No | Yes |

Table 530

| Rule ID | Account ID | User ID | Transaction Rule |
|---|---|---|---|
| 1 | 1000001 | 101 | May not spend more than $50 in any transaction |
| 2 | 1000001 | 101 | May not spend more than $300 in a calendar month |
| 3 | 1000001 | 102 | May spend only at merchants with category code "grocery store" |
| 4 | 1000001 | 102 | May spend only at merchants located in Mountain View, CA |

Table 540

METHODS AND SYSTEMS FOR ACCOUNT MANAGEMENT OF GROUP ACCOUNTS

RELATED APPLICATION

The present invention claims priority to a U.S. provisional application 61/138,489 filed on Dec. 17, 2008.

BACKGROUND OF THE INVENTION

The present invention generally relates to methods and systems associated with financial transactions. More specifically, the present invention relates to methods and systems for account management of group accounts.

People's tendency to form groups for various purposes is an inherent characteristic of human civilizations. For example, a group of people may be formed for a social or business purpose. Examples include a book club, in case of a social purpose, and a company or a project team, in case of a business purpose. People also form groups for other socio-economic and/or practical purposes. A group of roommates sharing an apartment may serve such socioeconomic and/or practical purposes.

Many of these groups may need to conduct financial transactions, including collecting, spending, and tracking their financial resources and/or transactions. For example, groups may collect money in form of membership dues, contributions, charitable donations, and/or payments for work performed. Furthermore, groups may spend money in order to acquire various products and services as part of their normal operations. In one example, business project teams may need to buy office supplies and pay for travel expenses, and financial transactions may need to be audited by a financial controller. In another example, book clubs may need to pay expenses related to meetings, refreshments, and website maintenances, and authorization of financial transactions only by a particular member may be desired. Yet in another example, roommates may share joint financial responsibilities for paying rents, utility bills, and groceries, and authorization of a transaction by all roommates or only by a particular roommate may be desired. Furthermore, the roommates may want to review some or all financial transactions related to the joint financial responsibilities.

In addition to collecting or spending money on behalf of a group, group members and others who have monetary transactions associated with the group also need to track at least some portions of the monetary transactions incurred by the group in order to review, monitor, and ensure that money is spent according to their ethical, legal, and/or personal expectations related to the group.

Although conventional methods of managing financial activities of a group exist (e.g. a joint bank account), the conventional methods do not provide a fine level of control or granularity for group members to customize and personalize their options for group-associated payments, collections, or tracking of group account-related financial activities.

Therefore, effective and convenient systems and methods for each group member to authorize monetary collection or spending for a group account may be highly desirable. Furthermore, novel systems and methods which allow each group member to customize, track, and authorize financial items related to a relevant group account may also be desirable.

INCORPORATION BY REFERENCE

All publications and patent applications mentioned in this specification are herein incorporated by reference to the same extent as if each individual publication or patent application was specifically and individually indicated to be incorporated by reference.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a group account management system configured to provide financial transaction-related controls, privileges, tracking, and/or reporting for one or more users, members, and/or sub-groups is disclosed. This group account management system comprises a payments manager for receiving and/or responding to a transaction request associated with a group financial account; a rules manager for determining whether the transaction request can be authorized, restricted, and/or rejected according to user-managed one or more account-related rules for a transaction-related action by a user, a member, and/or a sub-group associated with the group financial account, wherein the user-managed one or more account-related rules may be created, managed, and/or enforced based on a type of a merchant, a particular name of the merchant, a particular location of the merchant, a type of a transaction initiator, a time-based rolling parameter, and/or other relevant parameters; and a rules and accounts information data storage for storing the user-managed one or more account-related rules and one or more user-related privileges, wherein the one or more user-related privileges can define who or which entity is authorized to modify the user-managed one or more account-related rules for the group financial account.

In another embodiment of the invention, a method for managing and administering a group financial account is disclosed. This method comprises the steps of receiving a transaction request for the group financial account in a group account management system, wherein the transaction request is typically initiated by a group member, a group financial account user, and/or an entity associated with the group financial account; determining whether the transaction request can be authorized, restricted, and/or rejected according to user-managed one or more account-related rules for a transaction-related action associated with the transaction request, wherein the user-managed one or more account-related rules may be created, managed, and/or enforced based on a type of a merchant, a particular name of the merchant, a particular location of the merchant, a type of a transaction initiator, a time-based rolling parameter, and/or other relevant parameters; authorizing or rejecting the transaction request based on the user-managed one or more account-related rules; processing the transaction request at least in part by using a payment network, a payments processor, and/or a payments manager which may be contained or operatively connected to the group account management system; and debiting or crediting the group financial account if the transaction request is authorized and/or processed successfully.

Yet in another embodiment of the invention, a group account management system is disclosed. This group account management system comprises a rules engine operatively connected to a payments processor and a payment network, wherein the rules engine is configured to determine whether a transaction request can be authorized, restricted, and/or rejected according to user-managed one or more account-related rules for a transaction-related action desired by a user, a member, and/or a sub-group associated with a group financial account, and wherein the user-managed one or more account-related rules may be created, managed, and/or enforced based on a type of a merchant, a particular name of the merchant, a particular location of the merchant, a type of a transaction initiator, a time-based rolling parameter, and/or other relevant parameters; and a communication interface such as a payments manager operatively connected with the rules engine, wherein the communication interface is configured to receive and/or respond to the transaction request associated with the group financial account.

Furthermore, in one embodiment of the invention, a method for operating a user-managed group account management system is also disclosed. This method comprises the steps of creating a user identity for one or more financial transaction activities of the group account management system; configuring user-managed account-related rules and user-managed account privilege settings; and monitoring and/or conducting the one or more financial transaction activities based on the user-managed account-related rules and the user-managed account privilege settings.

BRIEF DESCRIPTION OF DRAWINGS

Some of the features of the invention are described as set forth in the following figures and description. A better understanding of the features and advantages of the invention will be obtained by reference to the following detailed description that sets forth illustrative embodiments provided in accordance with the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for account management of group accounts. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

Unless specifically stated otherwise, as apparent from the following discussions, it is appreciated that throughout the specification, discussions utilizing terms such as "processing," "computing," "calculating," "determining," or the like, may refer in whole or in part to the action and/or processes of a processor, computer or computing system, or similar electronic computing device. As used herein, the term "processing" may also refer in whole or in part to the action and/or processes of a financial transaction processor, which may be a company (e.g. FirstData, Metavante, and Chase Paymentech), an individual, or other entity providing communication and transaction services to financial institutions. It will also be appreciated by persons skilled in the art that the term "users" referred to herein can be individuals as well as corporations and other legal entities. Furthermore, the processes presented herein are not inherently related to any particular computer, processing device, article or other apparatus. In addition, the invention is not limited to any particular processor, programming language, machine code, and other elements used to describe some embodiments of the invention. A variety of programming languages, machine codes, and other elements may be used to implement the teachings of the invention as described herein.

The present invention provides account management methods and systems for group accounts. Various aspects of the invention described herein may be applied to any of the particular applications set forth below. The invention may be applied as a standalone account management system or as a component of an integrated software solution for account management. The invention can be optionally integrated into existing business and financial processes and products seamlessly. It shall be understood that different aspects of the invention can be appreciated individually, collectively, or in combination with each other.

One aspect of the invention is related to a group account management system for managing and administering group accounts. The system may include a payments manager for receiving a transaction request relating to a group account. In addition, a rules manager may check whether the transaction request may be authorized according to rules applying to the group account. A data storage may also provided for storing the rules applying to the group account and privileges of members accessing the group account. In some embodiments of the invention, the privileges may define which members can add, remove, or edit the rules applying to the group account.

Another aspect of the invention is related to a method for managing and administering group accounts. This method may include a step for receiving a transaction request relating to a group account. In addition, the method may check whether the transaction request may be authorized according to rules applying to the group account, and may authorize or reject the transaction request depending on whether the transaction conforms to the rules applying to the group account. The method then may debit or credit the group account if the transaction request is authorized and transfer or receive money to other parties in accordance with the details of the transaction. In some embodiments of the invention, the rules applying to the group account may be added, removed or edited by members accessing the group account according to privileges of these members.

Furthermore, some aspects of the present invention address certain financial needs of groups. Certain financial needs of groups may include activities such as seamlessly establishing a group financial account, managing characteristics related to individual members associated with the group financial account, adjusting privileges for individuals or sets of individuals associated with the group financial account, allowing individuals to transact on behalf of the group according to their defined privileges, tracking account transactions according to their individual originator, and making pertinent information available to group members according to their privilege levels.

One objective of the present invention is to conceptualize a group account management system which manages and administers group accounts based on member-specific or sub-group-specific rules and privileges. Another objective of the present invention is to formulate a method for managing and administering group accounts in a computer system based on member or sub-group-specific rules and privileges.

In a conventional accounting management method for a group such as a joint bank account, a small number of individuals may have privileges on the joint bank account. For example, a small number of individuals on behalf of the joint bank account for a group may have a right called "signature authorization," which defines an authority to write checks and conduct other transactions on behalf of the group. These privileges in the conventional accounting management method generally grant all authorized individuals (e.g. who may have "signature authorization" rights) an equal level of privileges to spend money from the joint bank account (e.g. by signing checks or using a payment card) and to deposit money into the joint bank account (e.g. either in person with a bank teller or using the bank's ATM card).

Using a prior art method (e.g. a conventional joint bank account) to manage a group's financial activities may exhibit significant shortcomings in account management of group accounts. For example, creating a conventional joint bank account for a group can be a cumbersome process, because creation and ongoing management of a conventional joint bank account typically require physical presence of members with signature authorization rights when an addition or a modification of a member to associated with a group is desired for a joint bank account representing the group. Therefore, a conventional joint bank account may be particularly cumbersome and inconvenient for "virtual" groups associated with social networking sites or other Internet-based organizations. For example, groups within a popular social networking site such as Facebook may not have frequent in-person meetings, if at all, due to members' geographical separation. For virtual groups, adding or removing authorized signers on a conventional joint bank account is particularly difficult or impracticable. In addition, joint ownership and signature authorization on a conventional joint bank account does not offer a customizable control or a fine granularity management of member-specific privileges for a particular member. Furthermore, providing account access of a conventional joint bank account to a large number of group members is difficult, inconvenient, or even impracticable for most types of existing joint accounts in the market today. In addition, general account activities and especially electronic payment activities using joint accounts are not typically tracked on an individual member level for a conventional joint bank account, thereby making member-specific and/or member-driven tracking, reporting, accountability, and analysis of transaction origin difficult or impracticable.

An existing alternative to a conventional joint bank account described above is handling a group's financial activities manually and individually without a joint account structure. In this existing alternative, individual members are required to spend their own money on behalf of a group and seek reimbursement from the group account later. Unfortunately, this alternative has many shortcomings as well. For example, an individual member may forget to seek reimbursement or a reimbursement procedure may experience a significant delay for the individual member. In addition, the individual member may discover after incurring an expense on behalf of the group that the group has insufficient funds to reimburse its members properly. Furthermore, there may be a substantial manual-level tracking required for individual members and/or for a financial overseer for the group such as a treasurer in the existing alternative of manual and individual payment structure. Manual tracking of transactions may also suffer from inaccuracies and time lags introduced by human error or inefficiencies, which may include erroneous transaction data entries, failure of specific transaction entries, or delayed manual transaction entries. Furthermore, manual tracking of transactions, usually conducted using a spreadsheet application such as Microsoft Excel, is not an effective method for ubiquitous access of relevant financial information by a group's individual members, thereby making information access, audit, and feedback procedures difficult in many circumstances.

One embodiment of the present invention may be used to manage collection, spending, and tracking of funds for a group comprising one or more individual members. In this embodiment, individuals may share access, usage and control over a financial account such as a checking account, a savings account, a prepaid account, a credit account or line, a brokerage account, and etc. The present invention is not limited to the specific examples described herein, and various embodiments of the present invention may apply to different types of accounts.

Figure 1:
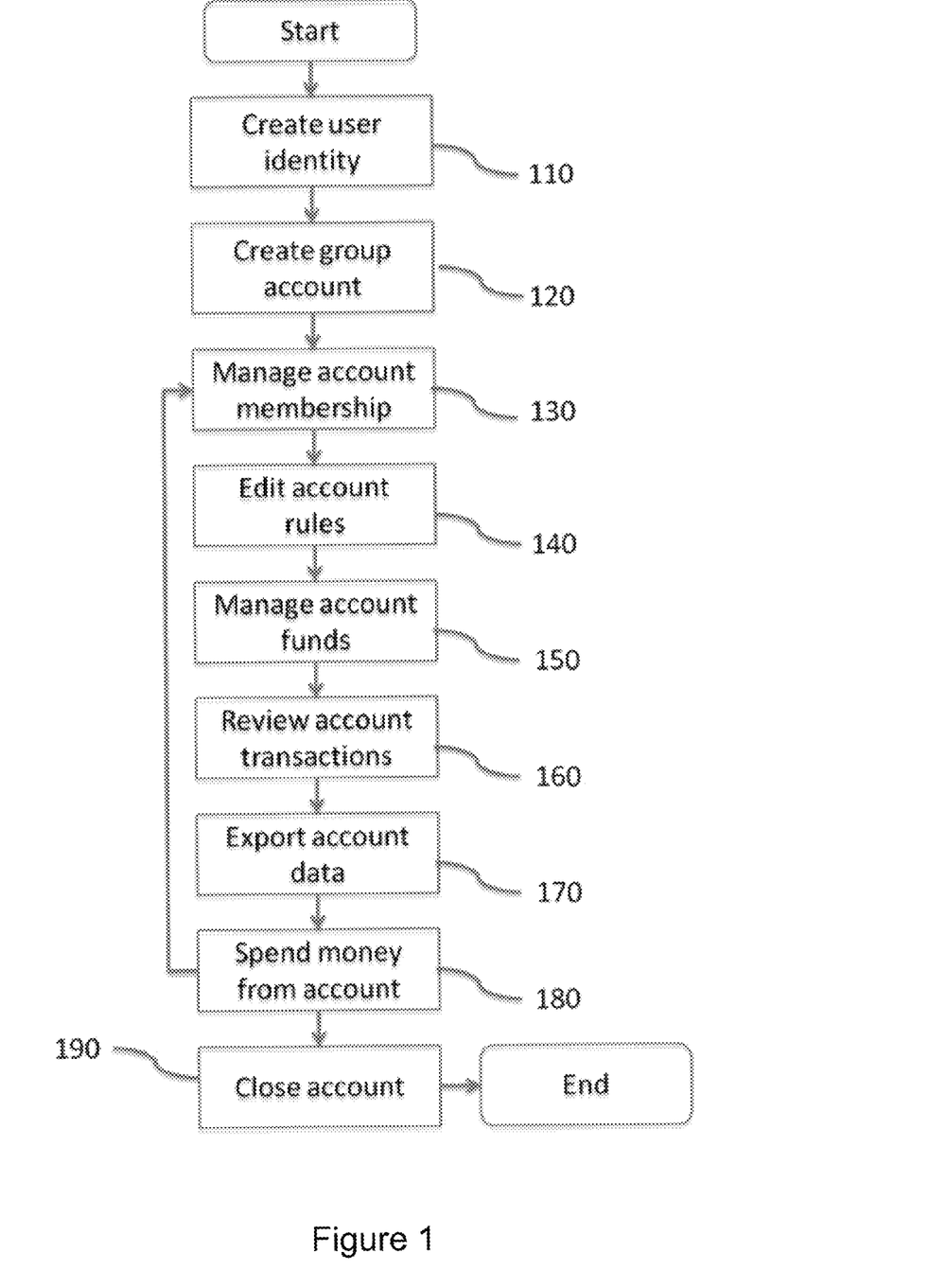
FIG. 1 shows a flowchart showing how a group account may be created and used in accordance with an embodiment of the present invention.

FIG. 1 shows a flowchart showing how a group account may be created and used in accordance with an embodiment of the present invention. An embodiment of the present invention allows individuals to access group accounts as shown by a flowchart in FIG. 1. As a first step, if an individual does not yet have a user account in the group account management system, the individual, interacting with the group account management system through one or more user interfaces (some of which have been described herein) may create his or her user identity, as shown in STEP 110. In this step, an individual (i.e. a user of the group account management system) may select a user name, password, and enter his or her biographical information and other necessary information (e.g. street address, email, and etc.) as directed by the group account management system. In STEP 120, the user may create a new group account, wherein the step of creating the new group account may include formulating an account name and setting additional parameters related to the new group account. Once the new group account is created, additional individuals may be invited to join the account via email, SMS, or any other form of notices, or the additional individuals may be added to the new group account by a person who has permission to do so, as shown in STEP 130. Then, account rules associated with the new group account and/or a particular user may be changed, as shown in STEP 140. In STEP 150, funds may be added or taken from the account in accordance with specific privilege levels and account rules associated with a particular user for the new group account. In STEP 160, account transactions and other data may be reviewed by one or more users, typically in accordance with specific privilege levels and account associated with them. In STEP 170, account-related data may be exported via one or more file formats (e.g. comma separated value formats, XML, etc.), via direct integration with relevant applications (e.g. Intuit's Quickbooks or Microsoft's GreatPlains), or via other appropriate means. In STEP 180, a particular user (e.g. an individual member of a group account or a subset user group of a group account) may spend money from the new group account by appropriate payment methods acceptable to a transacting party (e.g. an e-commerce site, a service provider, and etc.). Some examples of appropriate payment methods include, but are not limited to, electronic payment cards, checks, electronic orders such as wire and ACH transfers, bill payments, SMS, internal transfers to other group accounts, and etc.

Various steps described in STEP 110~STEP 180 above do not have to occur in any particular order and may happen more than one time or not at all. Therefore, various steps may be taken at any time, and the order of the steps described above does not need to be strictly maintained. For example, exporting account data (e.g. STEP 170) may be done at any time, even before editing account rules (e.g. STEP 140). Furthermore, a person with the appropriate privilege level may close the account via STEP 190 at any point.

Figure 2:
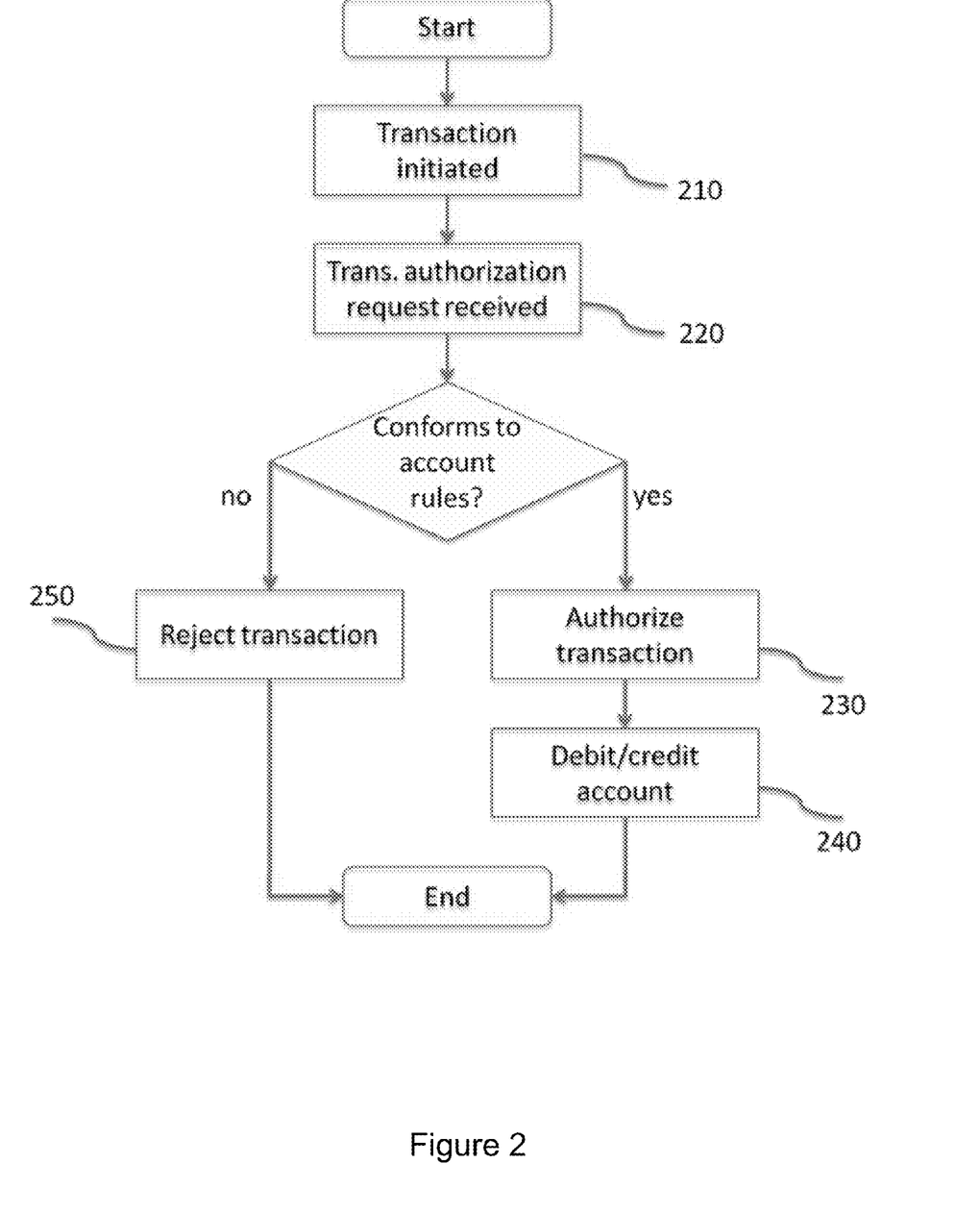
FIG. 2 shows an example of how a transaction may be initiated and processed in accordance with an embodiment of the present invention.

FIG. 2 illustrates the process which handles financial transactions for an account. In STEP 210, a transaction request is initiated. This request may be initiated from various sources such as point-of-sale (POS) terminals, online gateways, ATM's, and etc. The transaction request may be sent through a payment network and/or a payment processor. As shown in STEP 220, the transaction request may be received by a rules engine, another destination, and/or another entity which is able to process the transaction request. The rules engine may then determine whether a transaction request and/or an authorization should be granted or denied, as shown in STEP 225 according to at least some parameters associated with a financial transaction (e.g. payment request amount, account holder's or group member's identity, merchant's name and category, and etc.). In particular, as shown in STEP 225, the rules engine may check to see whether the transaction request conforms to account rules established for the group account.

The rules engine may also apply any other appropriate additional logic or filters. For example, a logic filter may attempt to identify fraudulent transactions or may check to ensure that an account carries sufficient balance to accommodate the transaction request. If the transaction request passes one or more filters, logic, and/or tests of the rules engine, then as shown in STEP 230, the transaction request may be authorized. Optionally, a transaction authorization message may be sent back to a transaction processor and/or a payment network. When a final confirmation of a successful execution of the requested transaction is received, as shown in STEP 240, a particular account related to the transaction request may be debited or credited as appropriate. In one embodiment of the invention, the particular account is a group account debiting or crediting to one or more members of the group account when the successful execution of the requested transaction is complete. In another embodiment of the invention, the particular account is a sub-group account within the group account which is capable of debiting or crediting to specific sub-group members when the successful execution of the requested transaction is complete. Yet in another embodiment of the invention, the particular account is limited to one particular member among a plurality of group members, wherein the particular account is capable of only debiting or crediting to one specific member within the plurality of group members, when the successful execution of the requested transaction is complete. However, if the transaction request fails one or more filters, logic, and/or tests of the rules engine, as shown in STEP 250, the transaction request may be rejected by the group account management system, and an appropriate message carrying an outcome of the rejection may be sent to the transaction processor and/or the payment network.

As described in further detail below, various types of rules may be applied and used by the rules engine to determine authorization or rejection of a requested transaction. Furthermore, an account member (e.g. a particular member of a group, sub-group members of a group, selected members from a group account, and etc.) may dynamically add, remove, and/or edit one or more rules which apply to their group accounts, wherein different rules may apply to different members, sub-groups, and/or other categorized groups of individuals per group account for financial transactions.

Figure 3:
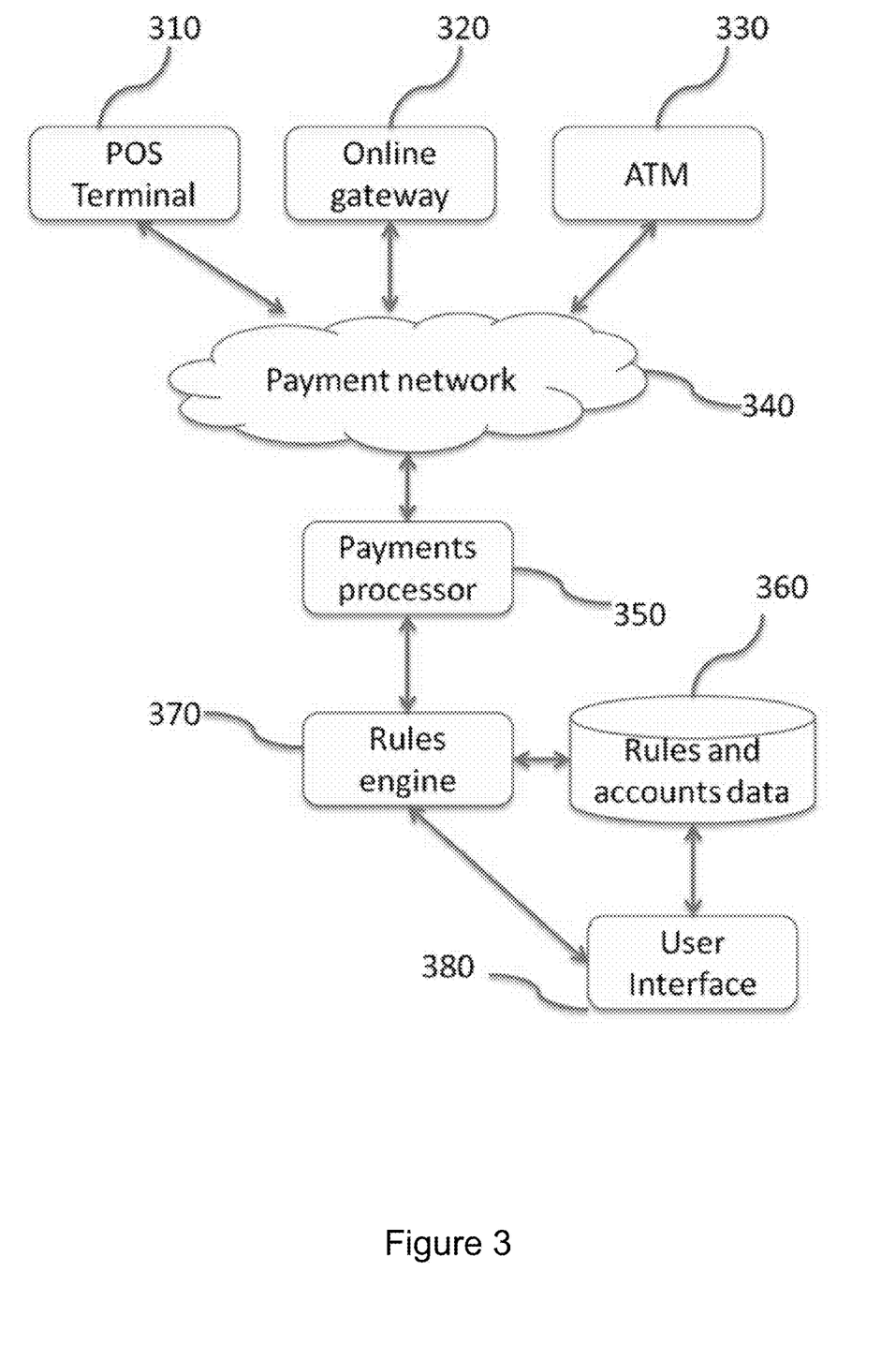
FIG. 3 shows a high-level example of a system architecture for account management of group accounts in accordance with an embodiment of the present invention.

FIG. 3 shows a high-level example of a system architecture for account management of group accounts in accordance with an embodiment of the present invention. In one embodiment of the invention, a Point-of-Service (POS) terminal (310) may serve as a transactional interface for accepting an electronic payment at a retail store. In addition, an online gateway (320) may serve as a transaction gateway for online or Internet initiation of an electronic payment. Moreover, an automated teller machine (ATM) (330) may be used to deposit and withdraw funds at a physical geographic location. In a preferred embodiment of the invention, the POS terminal (310), the online gateway (320), and the ATM (330) may be operatively connected to a payment processor (350) via a payment network (340). One skilled in the art will appreciate that the role of payment network (340) may be similar to payment networks currently provided by providers such as Visa, MasterCard, Pulse, Interlink, etc. Furthermore, one skilled in the art will further appreciate that the role of the payment processor (350) may be similar to the roles of payment processors currently played by companies such as First-Data, Metavante, and Chase Paymentech.

In a preferred embodiment of the invention, the payment processor (350) may be operatively connected to a rules engine (370) configured to determine whether a transaction request can be authorized, restricted, and/or rejected according to one or more account-related rules for a transaction-related action by a user, a member, and/or a sub-group associated with a group financial account.

In a preferred embodiment of the invention, one or more account-related rules can be created, managed, and/or enforced based on a type of a merchant, a particular name of the merchant, a particular location of the merchant, a type of a transaction initiator, and/or a time-based rolling parameter. The rules engine (370) may be operatively connected to a data storage (360), which may store rules and accounts data. In addition, the rules engine (370) and the data storage (360) may also be operatively connected to a user interface or a user interface (UI) application (380). The user interface or UI application (380) may also interact with the data storage (360) and may allow users and administrators of a group account management system to process, store, and/or control their data, account-specific control, and/or operational features of the group account management system.

Figure 4:
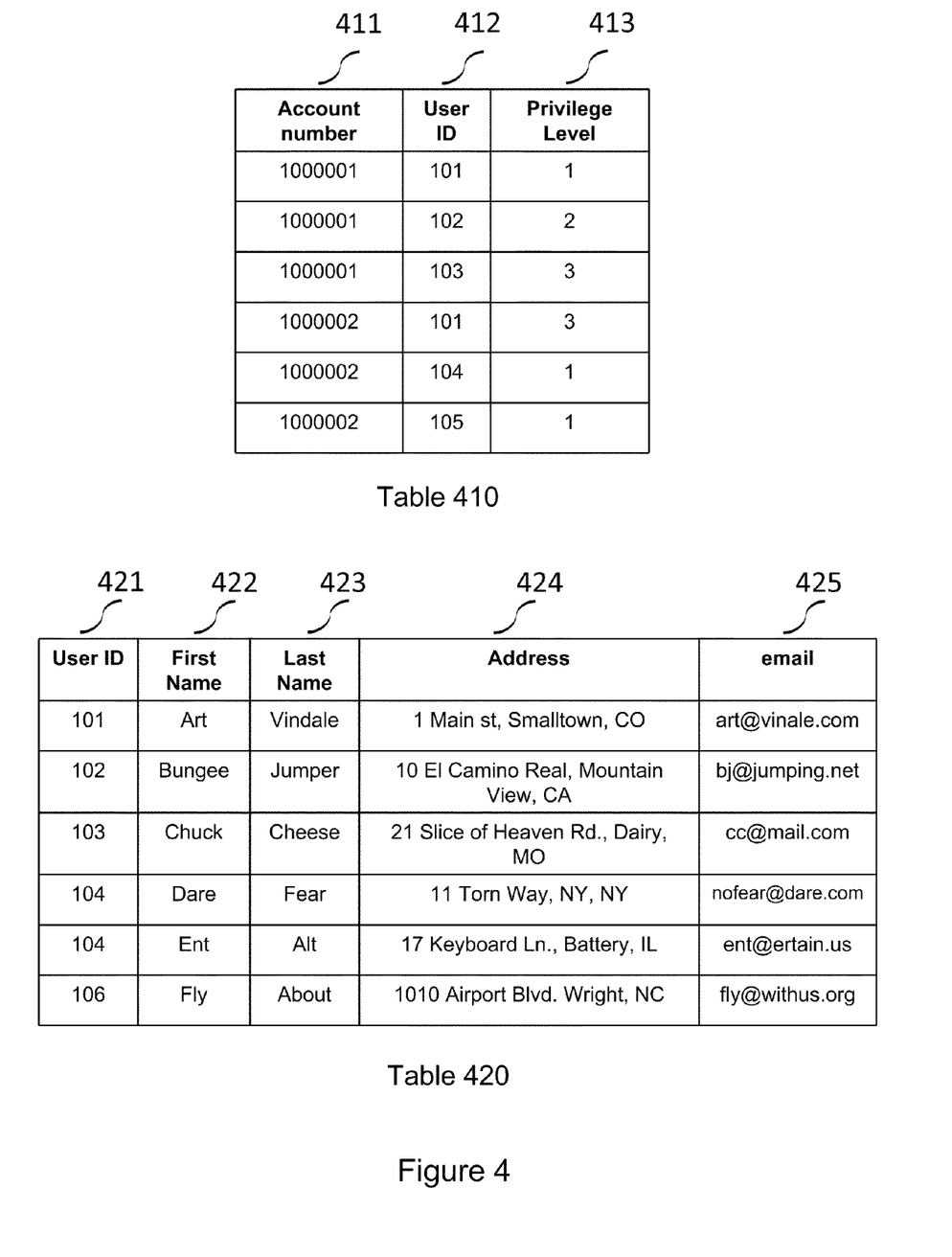
FIG. 4 shows an example of data structures which may be used for implementing a system and/or a method incorporating at least some aspects of the present invention.

FIG. 4 shows an example of data structures (e.g. Table 410, Table 420) which may be used for implementing a group account management system and/or a method incorporating at least some aspects of the present invention. Examples shown in FIG. 4 illustrate how data may be stored and arranged according to specific rules (e.g. privilege levels). Furthermore, FIG. 4 also shows how account information data can be arranged and stored. In accordance with one embodiment of the invention, Table 410 illustrates a relationship maintained among account numbers (Column 411) (i.e. each of which represents a particular group account), user ID's (Column 412) (i.e. each of which represents a particular group member or a particular sub-group), and privilege levels (Column 413) (i.e. per a particular group member or a sub-group).

Referring to Table 410, the account numbers are stored in Column 411, the user ID's are stored in Column 412, and the privilege levels for group members or sub-groups are stored in Column 413. Furthermore, Table 420 illustrates an example of some personal or identifying data related to a group member or a sub-group, identified by a user ID (Column 421). In the example of Table 420, a user ID may be stored in Column 421, a user's first and last name or a sub-group's name may be stored in Column 422 and/or Column 423. In addition, the user's mailing address may be stored in Column 424, and the user's email address may be stored in Column 425.

Figure 5:
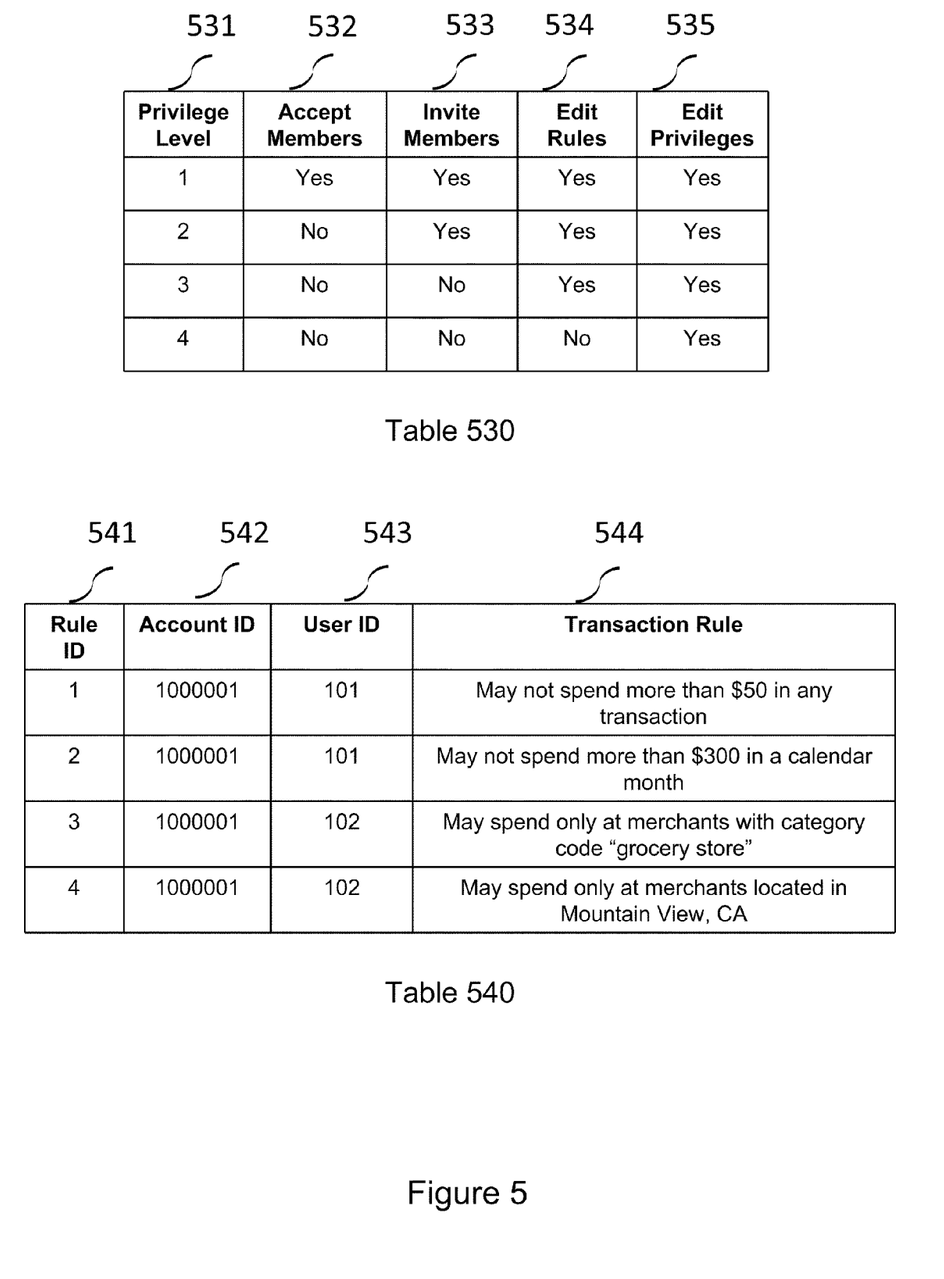
FIG. 5 shows another example of data structures which may be used for implementing a system and/or a method incorporating at least some aspects of the present invention.

FIG. 5 shows another example of data structures (Table 530, Table 540), which may be used for implementing a group account management system and/or a method incorporating at least some aspects of the present invention. Table 530 in FIG. 5 illustrates relationships between user privilege levels and authorized functions per privilege level. For example, privilege level identification numbers may be stored in a group account management system, as shown in Column 531. "Accept Members" section as shown in Column 532 may indicate whether a user or a sub-group who holds a particular privilege level (e.g. as defined in Column 531) is permitted to accept new members to a relevant group account. In addition, "Invite Members" section as shown in Column 533 may indicate whether a user or a sub-group associated with a particular privilege level is permitted to invite members to the group account. Furthermore, "Edit Rules" in Column 534 may indicate whether a user or a sub-group associated with a particular privilege level is authorized to edit at least some portions of group account rules. Moreover, "Edit Privileges" in Column 535 may indicate whether a user or a sub-group associated with a particular privilege level is authorized to edit other users' group account privilege levels.

Table 540 illustrates an example of rules which may be associated with a particular account and/or a particular user. In one embodiment of the invention, as shown in Table 540, a unique identifier for each rule may be stored in Column 541. Group accounts (e.g. Account ID's) as shown in Column 542 and users (e.g. User ID's) as shown in Column 543 can also be associated with particular transaction rules in Column 544. Transaction rules in Column 544 can permit or restrict certain behaviors, functions, and/or conditions for a particular user and/or a group account. Furthermore, a rule (e.g. a rule entry in Column 544) may apply to a certain privilege level instead of a particular user as categorized by User ID's in Column 543. Therefore, privilege levels may be stored in Column 543 instead of User ID's.

A person skilled in the art will appreciate that there are different embodiments to categorize, arrange, and/or store transaction rules other than specific examples described in the Specification. The invention is by no means limited to particular examples of rules described herein. The particular examples of rules described herein are merely examples provided for clarity. A person skilled in the art will also appreciate that additional data may be collected, stored and/or used in a data storage or a database system. Furthermore, the person skilled in the art will also appreciate that implementations of the data storage or the database system may be achieved using known and conventional methods well known in the art.

In one example of an embodiment of the invention, a person named "Art Vindale" may create a user account number by designating "a User ID "101" in a group account management system, as illustrated by the first line in Table 420 of FIG. 4. Art may provide personal, group-specific, and/or member-specific identifying information such as a name, a mailing address, an email address, and etc, as also illustrated by the first line in Table 420 of FIG. 4. Art may then create and/or access a group account which has an Account ID of "1000001". Art may also be assigned a Privilege Level "1" on this group account, as illustrated by the first line in Table 410 of FIG. 4. Art may then add Bungee Jumper and Chuck Cheese (i.e. User ID's 102 and 103 in table 420, respectively) to the group account, and Art may assign them Privilege Levels "2" and "3", respectively.

Continuing with the example above, Bungee and Chuck are allowed to edit account rules and account privileges, according to the definition of the privilege levels maintained in Table 530 of FIG. 5. Bungee can invite new members to the group account which Art created, while Chuck is not allowed to invite new members. In this particular example, neither Bungee nor Chuck can accept new members to the group account. Furthermore, if Chuck proceeds to edit some rules on the account, he may set a first rule (e.g. Rule ID "1" in the first line of Table 540) to specify that Art, who has User ID "101", is not allowed to spend more than $50 in any single transaction for the group account (e.g. Account ID "1000001"). Chuck may set an additional rule (e.g. Rule ID "2" in the second line of Table 540) to specify that Art is not allowed to spend more than a total of $300 in any calendar month. Additional rules exemplified by the third and fourth lines of Table 540 may also be set by a user who is authorized to edit rules for a specific member and/or a sub-group represented by User ID "102". For example, Rule ID "3" can limit Bungee's (i.e. identified by User ID "102") spending to merchants with category code "grocery store" from the group account associated with Account ID "1000001". Similarly, Rule ID "4" can limit Bungee's (i.e. identified by User ID "102") spending to merchants located in Mountain View, Calif. for the group account associated with Account ID "1000001".

In addition, one or more group account members may add funds to a group account using various methods. For example, Art may use his debit card to transfer money from his checking account to the group account. Bungee may transfer funds from his savings account using an ACH transfer. Chuck may add funds to the group account from his home equity line of credit. Potential methods of adding funds to a group account are not limited to these specific examples.

In an example of an embodiment of the invention, Bungee may proceed to spend $25 at the local Walgreen's store using a payment card linked to the group account, while Art may pay the group's $45 utility bill using a bill payment service. As another example, Art's attempt to pay a $76 phone bill on behalf of a group associated with a group account may be denied because it is a violation of Rule ID "1", which limits Art's transactions to no more than $50 per transaction. At a later time, Chuck may review at least some transactions conducted in the group account and export a transaction history from the group account management system to a financial software program, such as Microsoft Money. Beyond specific examples described above, there are a variety of ways that the transactions may be reviewed using various methods and/or tools which will be perceived as obvious for one skilled in the art.

Figure 6:
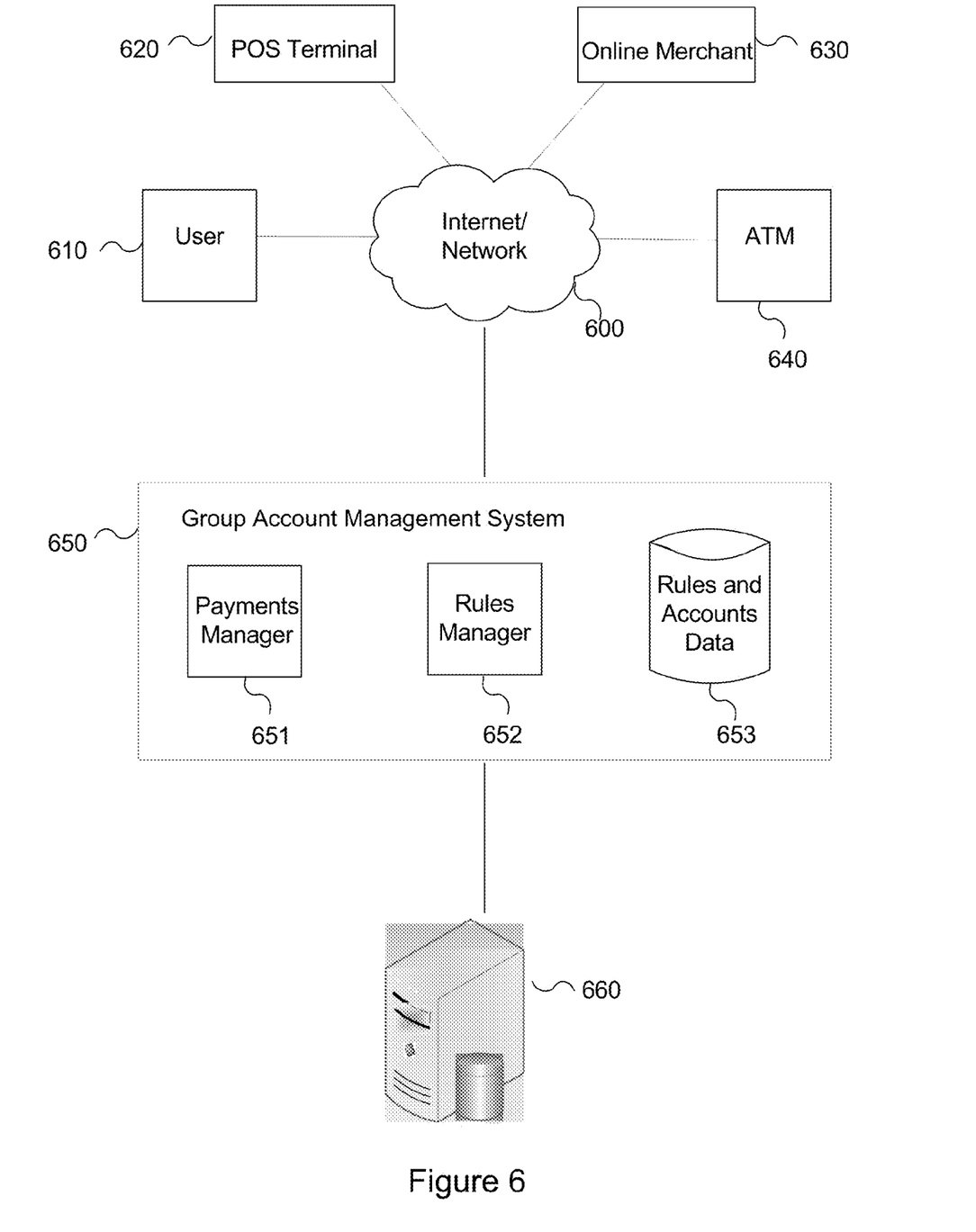
FIG. 6 shows an example of a system architecture for account management of group accounts in accordance with an embodiment of the present invention.

FIG. 6 shows an example of a system architecture for account management of group accounts in accordance with an embodiment of the present invention. In a preferred embodiment of the invention, the group account management system (650) is operatively connected to a data server/storage (660), a POS Terminal (620), an online merchant payment gateway (630), a user (610), and/or an ATM (640), typically using one or more networks (600) such as the Internet and/or a local area network (LAN). In one embodiment of the invention, the user (610) may initiate a transaction operation using the POS terminal (620). An example of the POS terminal (620) includes an electronic payment apparatus for customers at a checkout counter of a retail store. The online merchant payment gateway (630) may be used to handle transactions initiated over the World Wide Web or Internet. The ATM (640) can be used to deposit and withdraw funds at a physical location. Other interfaces can also be operatively connected to the group account management system (650) to initiate transactions. A payments manager (651) within the group account management system (650) may transmit or receive transactional data with payment networks such as Visa, MasterCard, Pulse and Interlink. Furthermore, the payments manager (651) may be also configured to communicate with payment processors such as FirstData, Metavante, and Chase Paymentech. In one embodiment of the invention, the payment manager (651) is configured to accept a transaction request, inquire a rules manager (also called a rules engine) (652) to evaluate the transaction request according to one or more account-related rules, and transmit a response to a transaction initiator (e.g. a user, a POS device, a computer terminal, and etc.) and/or a payments network. One example of a response to a transaction initiator is a confirmation of a successful transaction request submission to a payments network. Another example of a response to the transaction initiator is a message of restriction and/or rejection regarding a transaction request based on one or more account-related rules. Furthermore, an example of a communication message to the payments network from the payments manager (651) is a transaction process request based on a transaction request from the transaction initiator, wherein the transaction process request to the payments network may occur if the rules manager (652) determines that the transaction request conforms to relevant account-related rules. In addition, another example of a communication message is a response to the payments network authorizing or rejecting a transaction request. The group account management system (650) may also include a rules and accounts information data/storage (653). The group account management system (650) may be associated with one or more data server/storages (660) for system implementation and/or operation.

The group account management system maintaining and enforcing group account-related rules may use, without limitation, any combination of the parameters and their values which are associated with any aspect of transactions including initiation, management, and authorization. For example, the group account management system maintaining the group account-related rules may store and/or use information relating to users, group members, groups, and/or sub-groups, wherein the group account-related rules may apply for transaction-related activities. The system may also track types of rule-related actions or requests such as adding funds to a group account, withdrawing money from the group account, making payments from the group account, viewing account transaction history, exporting account data, editing account rules, and managing account memberships.

Furthermore, in a preferred embodiment of the invention, the group account management system is capable of tracking device types, device identities, and/or protocols used for transactions. For example, the group account management system may keep track of how each transaction was initiated by a payment card at a POS terminal, by an online payment gateway, by an ATM terminal, by an application's Web interface, by an Interactive Voice Response System (IVR), by a mobile interface such as SMS communications, by a mobile Internet browser, by a mobile phone with a specific serial number, and/or by a personal computer using a Network Interface Card with a specific MAC (Media Access Control) address. Therefore, a rule may allow for a certain transaction by a user from a specific mobile device, but not from a computer. Similarly, another rule may allow transactions of no more than $25 initiated from a mobile phone, while allowing larger transaction amounts initiated using an ATM for a particular user. The group account management system may track other information and integrate other methods other than examples described above for the preferred embodiment of the invention.

In addition, in one embodiment of the invention, the group account management system may also track, store, and use location-related information for creation, management, and/or enforcement of account-related rules, typically managed by a rules manager (e.g. 652 in FIG. 6). The location-related information may include a name of a merchant from which a transaction was initiated (e.g. Safeway), a type of the merchant (e.g. grocery store), and/or physical location information in varying levels of specificity (e.g. Safeway's store on 222 El Camino Real in Mountain View, Calif. 94043 (very specific); a "grocery store" in Mountain View, Calif. (less specific); Zip code 94043 (storing zip code only); California (storing state location only); United States (storing country location only)).

Other details and types of information which may be tracked, stored, or used for creation, management, and/or enforcement of account-related rules include money amounts involved in a transaction, a group account balance, time and date information related to the transaction (e.g. Thursday, Nov. 13, 2008 at 11:36 AM). Moreover, the group account management system may retain, track, and/or use aggregate amounts, defined herein as a time-based "rolling" parameter, which can be periodically or dynamically calculated to check whether the transaction, if authorized, will exceed a specified limit as an aggregate amount in an account-related rule. In one example, a daily aggregate expenditure limit of $500 for a group account may be specified, tracked, and/or used by the rules manager (e.g. 652 in FIG. 6) of the group account management system. In another example, a rule limiting a specific user from spending more than $200 during a seven consecutive day period at merchants whose category is "entertainment" is an example of an aggregate spending account-related rule for a particular member of a group or a sub-group. Yet in another example, an account-related rule may limit a specific sub-group (i.e. a collection of certain users) of a group account from spending more than a total of $1,000 per calendar month at merchants whose categories include groceries, home improvement, or transportation. Various types of account-related rules can be contemplated by various embodiments of the invention, and the invention is not limited to the specific examples as described herein.

In a preferred embodiment of the invention, a group account management system can define and utilize account-related rules using any parameters associated with a given transaction. Some parameters may be generated when a transaction is initiated (i.e. typically defined by industry-standards) and may include parameters such as transaction time and transaction amount. Other parameters, such as a name of a person involved in a transaction and a balance of a group account, may be deduced, extrapolated, or interpreted by the group account management system. Furthermore, some parameters, such as transaction amount limits and permitted geographical locations for transactions, may be arbitrarily defined by users or administrators of the group account management system.

To further illustrate the types of rules that are contemplated by some embodiments of the invention, the following examples are described. Examples of account-related rules of a group account management system in accordance with the invention include: (1) Person "A" can only view a group account's transaction history; (2) Person "A" can only view the group account's transaction history using an ATM terminal located in Mountain View, Calif.; (3) Person "A" can only view the group account's transaction history using an ATM operated by a specific bank located in Mountain View, Calif.; (4) Persons "B", "C", and "D" may only view transactions that they initiated on the group account; (5) Person "B" can spend no more than $25 in any transaction; (6) Person "B" can spend no more than $50 per day; (7) Persons "B" and "C" can spend no more than $200 per week; (8) Person "B" can spend no more than $100 per month at merchants whose category is "entertainment"; (9) Persons "B" and "C" can spend no more than $300 per week together; (10) Person "C" can spend no more than $70 per day, only at Safeway stores and only on Monday through Friday; and/or (11) Person "E" can edit all account rules. These group account-related rules described herein are merely examples for some potential embodiments of the invention and do not limit the scope of the invention to these specific examples.

As previously described in some examples, at least some embodiments of the invention may enable initiation and operation of a group financial account shared by one or more users, members, and/or sub-groups. Individuals and/or entities associated with a group account may be able to dynamically define rules according before, during, and after financial transactions according to their specified privilege levels and applicable rules. In addition, a rules engine in various embodiments of the invention may treat a shared or group account as a dynamic aggregation of transaction streams by checking transaction requests against a dynamically calculated aggregation of any of the previous transactions associated with the shared or group account. Therefore, members, users, and/or sub-groups of a group account may have an ability to virtualize certain selections of transactions as if they were in separate accounts without actually maintaining separate accounts.

Multiple accounts or products do not necessarily need to be grouped in order to provide richer functionality. Instead, content-rich and/or unique functions such as virtualizing, aggregating, and segmenting activities of multiple users, members, and/or sub-groups can be accessible on a shared, single group account. These content-rich and/or unique functions may enable group accounts to benefit from higher interest rates received on funds deposited in the account. Financial institutions may offer variable interest rates based on the amount of money deposited in a group account. For instance, a group account with a balance below $1,000 may receive no interest, while a group account with balance between $1,000 and $10,000 may receive 1% interest rate, and a group account with balance over $10,000 may receive 2% interest rate. Following this example, a company which maintains expense accounts, each of which carrying a $500 balance for three project teams would normally not receive any interest on its deposited funds. However, if the company combines the three accounts into one group account in accordance with an embodiment of the invention, the group account may carry a balance of $1,500 and earn 1% interest, while still ensuring that no project team will be able to spend more than the $500 originally allotted to it. Furthermore, the company in this example may maintain only $1,000 in a group account shared by the three project teams, if it is unlikely that all of the teams will actually spend their allotted $500 budget. Each project team is still not allowed to use more than its allotted $500 per project team with a group account balance of $1,000, and a remaining $500 can be used for some other purpose.

In another similar example, a family may be able to control its spending according to a pre-determined budget by ensuring that all entertainment expenses are aggregated through a virtual "entertainment expenses" stream and do not exceed $400 per month, for example, regardless of who initiates a transaction or what the balance on a group account is.

All concepts and/or embodiments of the invention may be incorporated or integrated with other systems and methods for account management and administration, including but not limited to those described in U.S. Pat. No. 7,103,784 (Brown et al.) issued on Sep. 5, 2006 and U.S. Patent Publication No. 2008/0014904 (Crimi et al.) published on Jan. 17, 2008, which are hereby incorporated by reference in their entirety. In addition, all concepts and/or embodiments of the invention may be incorporated or integrated with a U.S. Provisional Patent Application 61/114,033 (Livnat) filed on Nov. 12, 2008, which is hereby incorporated by reference in its entirety.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A group account management system configured to provide financial transaction-related controls, privileges, tracking, and/or reporting for one or more account holder members and/or sub-groups, the group account management system comprising:

a payments manager executed on a CPU and a memory unit of a computer system for receiving and/or responding to a transaction request associated with a group financial account;

a rules manager executed on the CPU and the memory unit of the computer system for determining whether the transaction request is authorized, restricted, and/or rejected according to account holder member-managed one or more transaction-related rules for a transaction-related action by an account holder member and/or a sub-group associated with the group financial account, wherein the account holder member-managed one or more transaction-related rules are created, managed, and/or enforced based on a type of a merchant, a particular name of the merchant, a particular location of the merchant, a type of a transaction initiator, a time-based rolling parameter, and/or other transaction-related parameters; and a rules and accounts information data storage contained by or operatively connected to the computer system for storing the account holder member-managed one or more transaction-related rules and one or more account holder member-managed privileges, wherein the one or more account holder member-managed privileges define who is authorized to modify the account holder member-managed one or more transaction-related rules for the group financial account.

2. The group account management system of claim 1, further comprising a data server and/or storage unit associated with or incorporated by the computer system, which contains at least some portions of the payments manager, the rules manager, and/or the rules and account information data storage.

3. The group account management system of claim 2, wherein the data server and/or storage unit is operatively connected to a data communication network such as the Internet, wherein the data communication network enables an operative connection of a point-of-service (POS) terminal, an online merchant payment gateway, an automated teller machine (ATM), and/or an account holder member accessing a computer or a mobile device with the group account management system.

4. The group account management system of claim 1, wherein the rules and accounts information data storage is configured to store, manage, and/or control a plurality of group financial accounts which are associated with distinct transaction-related rules and distinct account holder member-managed privileges per group financial account.

5. The group account management system of claim 1, wherein each of the account holder member-managed one or more transaction-related rules comprises a rule ID identifying a particular rule entry, a group account ID identifying a particular group financial account, an account holder member ID identifying a particular individual and/or an entity subject to the transaction-related rule, and a transaction rule description containing specific instructions for the transaction-related rule.

6. The group account management system of claim 1, wherein the one or more account holder member-managed privileges comprise one or more privilege levels identifying varying levels of privilege tiers for a plurality of account holder members and/or sub-groups.

7. The group account management system of claim 6, wherein the one or more privilege levels include options to accept members, invite members, edit at least some transaction-related rules, and edit privilege levels of certain account holder members and/or sub-groups for the group financial account.

8. The group account management system of claim 1, wherein the account holder member-managed one or more transaction-related rules and the one or more account holder member-managed privileges are created, modified, and/or removed by an account holder member with an appropriate account holder member privilege level.

9. The group account management system of claim 1, wherein the type of the merchant is a grocery store, a retail store, an online store, and/or any other appropriate merchant categories.

10. The group account management system of claim 1, wherein the type of the transaction initiator is defined as a particular account holder member, a particular point-of-service device, a computer, a mobile device, and/or any other appropriate entities initiating the transaction request.

11. The group account management system of claim 1, wherein the time-based rolling parameter is a transactional limit on an aggregate amount incurred over a specified time period by a particular account holder member and/or any other appropriate entities.

12. A method for managing and administering a group financial account, the method comprising the steps of:
receiving a transaction request for the group financial account in a group account management system executed on a CPU and a memory unit of a computer system, wherein the transaction request is typically initiated by a group financial account holder member, and/or an entity associated with the group financial account;
using the CPU and the memory unit of the computer system to determine whether the transaction request is authorized, restricted, and/or rejected according to account holder member-managed one or more transaction-related rules for a transaction-related action associated with the transaction request, wherein the account holder member-managed one or more transaction-related rules are created, managed, and/or enforced based on a type of a merchant, a particular name of the merchant, a particular location of the merchant, a type of a transaction initiator, a time-based rolling parameter, and/or other transaction-related parameters;
authorizing or rejecting the transaction request based on the account holder member-managed one or more transaction-related rules executed by the CPU and the memory unit of the computer system;
processing the transaction request at least in part by using a payment network, a payments processor, and/or a payments manager which is contained or operatively connected to the group account management system; and
debiting or crediting the group financial account if the transaction request is authorized and/or processed successfully.

13. The method of claim 12, wherein the account holder member-managed one or more transaction-related rules are created and/or modified by the group member, the group financial account holder member and/or the entity with an appropriate privilege level.

14. The method of claim 12, wherein the group account management system contains or operatively connects to a data communication network such as the Internet, which is further operatively connected to a point-of-service (POS) terminal, an online merchant payment gateway, an automated teller machine (ATM), and/or an account holder member accessing a computer or a mobile device.

15. The method of claim 12, wherein each of the one or more account holder member-managed transaction-related rules comprises a rule ID identifying a particular rule entry, a group account ID identifying a particular group financial account, an account holder member ID identifying a particular individual and/or an entity subject to a corresponding transaction-related rule, and a transaction rule description containing specific instructions for the corresponding transaction-related rule.

16. The method of claim 13, wherein the appropriate privileges level corresponds to a particular privilege tier which allows or restricts accepting members, inviting members, editing at least some account holder member-managed transaction-related rules, and editing privilege levels of certain account holder members and/or sub-groups for the group financial account.

17. A group account management system comprising:
a rules engine executed on a CPU and a memory unit of a computer system, which is operatively connected to a payments processor and a payment network, wherein the rules engine is configured to determine whether a transaction request is authorized, restricted, and/or rejected according to account holder member-managed one or more transaction-related rules for a transaction-related action desired by an account holder member and/or a sub-group associated with a group financial account, and wherein the account holder member-managed one or more transaction-related rules are created, managed, and/or enforced based on a type of a merchant, a particular name of the merchant, a particular location of the merchant, a type of a transaction initiator, a time-based rolling parameter, and/or other transaction-related parameters; and a communication interface such as a payments manager operatively connected with the rules engine executed on the CPU and the memory unit of the computer system, wherein the communication interface is configured to receive and/or respond to the transaction request associated with the group financial account.

18. The group account management system of claim 17, further comprising a rules and accounts information data storage operatively connected to the rules engine for storing the account holder member-managed one or more transaction-related rules and one or more account holder member-managed privileges, wherein the one or more account holder member-managed privileges define who is authorized to modify the account holder member-managed one or more transaction-related rules for the group financial account.

19. The group account management system of claim 17, wherein the rules engine, the payments processor, and/or the payment network are operatively connected to a POS terminal, an online gateway, an ATM, a computer, a mobile device, and/or other appropriate user interfaces.

20. A method for operating an account holder member-managed group account management system, the method comprising the steps of:

creating an account holder member identity for one or more financial transaction activities of the group account management system executed on a CPU and a memory unit of a computer system;

configuring account holder member-managed transaction-related rules and account holder member-managed account privilege settings associated with the group account management system executed on the CPU and the memory unit of the computer system, wherein the account holder member-managed transaction-related rules are created, managed, and/or enforced based on a type of a merchant, a particular name of the merchant, a particular location of the merchant, a type of a transaction initiator, a time-based rolling parameter, and/or other transaction-related parameters; and monitoring and/or conducting the one or more financial transaction activities based on the account holder member-managed account transaction-related rules and the account holder member-managed privilege settings associated with the group account management system executed on the CPU and the memory unit of the computer system.

* * * * *